United States Patent
Wu et al.

(10) Patent No.: US 11,790,013 B2
(45) Date of Patent: *Oct. 17, 2023

(54) SYSTEMS AND METHODS FOR GENERATING TRANSACTION PROFILE TAGS

(71) Applicant: Visa International Service Association, San Francisco, CA (US)

(72) Inventors: Keyuan Wu, Singapore (SG); Roan Joy Halili Cuares, Singapore (SG); Spiridon Zarkov, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,627

(22) Filed: Jun. 29, 2022

(65) Prior Publication Data

US 2022/0327161 A1    Oct. 13, 2022

Related U.S. Application Data

(63) Continuation of application No. 16/722,072, filed on Dec. 20, 2019, now Pat. No. 11,386,165.

(Continued)

(51) Int. Cl.
*G06Q 40/00*    (2023.01)
*G06F 16/908*    (2019.01)
(Continued)

(52) U.S. Cl.
CPC .......... *G06F 16/908* (2019.01); *G06F 16/285* (2019.01); *G06Q 20/4016* (2013.01); *G06Q 40/02* (2013.01)

(58) Field of Classification Search
CPC .... G06Q 40/00; G06Q 20/4016; G06Q 40/02; G06F 16/908; G06F 16/285
See application file for complete search history.

(56) References Cited

U.S. PATENT DOCUMENTS 10,970,792 B1    4/2021    Benkreira et al.
2005/0209876 A1    9/2005    Kennis et al.
(Continued)

FOREIGN PATENT DOCUMENTS

CN    108734217 A    11/2018
CN    109064227 A  * 12/2018    ......... G06Q 30/0201

OTHER PUBLICATIONS

Kasa et al., "Improving Credit Card Fraud Detection by Profiling and Clustering Accounts," Systems and Information Engineering Design Symposium (SIEDS), 2019, pp. 1-6, doi: 10.1109/SIEDS.2019.8735623.

(Continued)

*Primary Examiner* — Lalita M Hamilton
(74) *Attorney, Agent, or Firm* — THE WEBB LAW FIRM

(57) ABSTRACT

Methods for generating transaction profile tags from profile transaction activity may include receiving a transaction profile including recorded transactions, associating at least one transaction label with each of the transactions, the labels associated with transaction types, generating a set of profile features based on the recorded transactions from the transaction profile, encoding the set of profile features with a macro-encoder into a first-reduced set, clustering the first-reduced set into at least two subsets, each associated with a macro-profile tag, and tagging the transaction profile with one of the macro-profile tags. Methods may also include encoding the set of profile features with a micro-encoder selected based on the tagged macro-profile tag, clustering the second-reduced set into a plurality of subsets associated with account profile types, respectively, and tagging the transaction profile with a tag associated with the account profile type. Systems and computer program products are also provided.

20 Claims, 5 Drawing Sheets

Related U.S. Application Data

(60) Provisional application No. 62/783,306, filed on Dec. 21, 2018.

(51) Int. Cl.
    *G06Q 40/02*     (2023.01)
    *G06Q 20/40*     (2012.01)
    *G06F 16/28*     (2019.01)

(56) References Cited

U.S. PATENT DOCUMENTS

| | | |
|---|---|---|
| 2015/0379429 A1 | 12/2015 | Lee et al. |
| 2016/0364794 A1 | 12/2016 | Chari et al. |
| 2017/0083920 A1 | 3/2017 | Zoldi et al. |
| 2017/0230404 A1 | 8/2017 | Ramos de Araujo et al. |
| 2017/0293836 A1 | 10/2017 | Li et al. |
| 2019/0073647 A1 | 3/2019 | Zoldi et al. |
| 2019/0130453 A1* | 5/2019 | Sasapu ............... G06Q 30/0631 |
| 2020/0034842 A1 | 1/2020 | Ponniah et al. |

OTHER PUBLICATIONS

Song et al., "Auto-encoder Based Data Clustering", 2013, pp. 117-124.

* cited by examiner

SYSTEMS AND METHODS FOR GENERATING TRANSACTION PROFILE TAGS

CROSS REFERENCE TO RELATED APPLICATIONS

This application is a continuation of U.S. patent application Ser. No. 16/722,072, filed Dec. 20, 2019, which claims priority to U.S. Provisional Patent Application No. 62/783,306, filed Dec. 21, 2018, which are incorporated herein by reference in their entirety.

BACKGROUND

1. Field

This disclosure relates generally to generating transaction profile tags and, in some non-limiting embodiments or aspects, to systems and methods for generating profile tags based on transactions of a transaction profile.

2. Technical Considerations

Activity of an account (e.g., recorded transactions) for individuals may be analyzed to help determine whether a given transaction, purportedly initiated by the individual associated with the account, is fraudulent or non-fraudulent. For example, in response to receiving transaction data associated with a transaction, comparisons of certain aspects of the transaction (e.g., a transaction value) to predetermined thresholds (e.g., a transaction value limit) may be used to identify suspect transactions (e.g., transactions that may be fraudulent). Once identified as suspect, these transactions may be denied or investigated further to determine whether the transaction is a fraudulent transaction. For example, if an individual makes a purchase for a significant amount, a call may be made to the individual to inquire and verify whether that individual initiated the purchase.

However, where the predetermined thresholds are satisfied and the transaction is a fraudulent transaction, the transaction may be processed without additional inquiry. For example, data associated with transactions that are fraudulent may be transmitted to one or more devices without being identified as fraudulent (e.g., a transaction service provider system may transmit transaction data associated with a transaction that is fraudulent to an issuer system), and the one or more devices (e.g., the issuer system) may expend computational resources to determine whether the transaction is fraudulent and/or may process the transaction. This, in turn, may consume network resources unnecessarily (e.g., when determining, at the issuer system, whether the transaction is a fraudulent transaction or later when a chargeback is issued by the issuer system). Further, transactions may be unintentionally identified as fraudulent (e.g., where the transaction does not satisfy a threshold) and, as a result, additional computational resources and/or additional network resources may be consumed when the transaction is re-initiated.

SUMMARY

Accordingly, provided are improved systems, methods, and apparatus for generating profile tags based on profile transaction history such as, for example, historical purchase data.

In some non-limiting aspects, a method for generating transaction profile tags based on transaction profile activity is disclosed. The method may include receiving, with at least one processor, a transaction profile including a plurality of recorded transactions; associating, with at least one processor, at least one transaction label from among a plurality of transaction labels with each of the plurality of recorded transactions, each transaction label associated with a transaction type; generating, with at least one processor, a set of pre-processed feature values corresponding to a set of profile features based on the plurality of recorded transactions from the transaction profile and the transaction labels corresponding to each of the plurality of recorded transactions, the set of profile features having a first dimension; processing, with at least one processor, the set of pre-processed feature values with a macro-encoder to generate a first-reduced set of pre-processed feature values corresponding to a first-reduced set of profile features having a second dimension less than the first dimension; clustering, with at least one processor, the first-reduced set of pre-processed feature values into at least two subsets of first-reduced feature values, a first subset of first-reduced feature values associated with a first macro-profile tag and a second subset of first-reduced feature values associated with a second macro-profile tag; tagging, with at least one processor, the transaction profile with either the first macro-profile tag or the second macro-profile tag based on the clustering of the first-reduced set of feature values; processing, with at least one processor, the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; clustering, with at least one processor, the second-reduced set of feature values into a plurality of subsets of second-reduced feature values, each subset of second-reduced feature values associated with a micro-profile tag corresponding to a unique account profile type; and tagging, with at least one processor, the transaction profile with the micro-profile tag based on the clustering of the second-reduced set of feature values.

In some non-limiting aspects, the method may include determining, with at least one processor, an ordering of at least two subsets of first-reduced feature values.

According to some non-limiting aspects, the method may include determining, with at least one processor, an ordering of the plurality of subsets of second-reduced feature values.

In some non-limiting aspects, the first macro-profile tag is associated with transaction profiles having features corresponding to low-threshold purchases, and the second macro-profile tag is associated with transaction profiles having features corresponding to high-threshold purchases.

According to some non-limiting aspects, each account profile type from among the plurality of account profile types is associated with features corresponding to a partially-unique set of behavior characteristics.

In some non-limiting aspects, the method further includes receiving, with at least one processor, an instant transaction; generating, with at least one processor, at least one feature value for the instant transaction; determining, with at least one processor, that the at least one feature value does not correspond to a feature associated with the account profile type; and determining, with at least one processor, that the instant transaction is a suspect transaction based on the determination that the at least one feature value does not correspond to a feature associated with the account.

According to some non-limiting aspects, the method further includes receiving, with at least one processor, an instant transaction; generating, with at least one processor, at least one feature value for the instant transaction; determining, with at least one processor, that the at least one feature value corresponds to a feature associated with the account profile type; and determining, with at least one processor, that the instant transaction is a non-suspect transaction based on the determination that the at least one feature value corresponds to a feature associated with the account profile.

In some non-limiting aspects, a system for generating transaction profile tags based on transaction profile activity is disclosed. The system may include at least one processor programmed or configured to: receive a transaction profile including a plurality of recorded transactions; associate at least one transaction label from among a plurality of transaction labels with each of the plurality of recorded transactions, each transaction label associated with a transaction type; generate a set of pre-processed feature values corresponding to a set of profile features based on the plurality of recorded transactions from the transaction profile and the transaction labels corresponding to each of the plurality of recorded transactions, the set of profile features having a first dimension; process the set of pre-processed feature values with a macro-encoder to generate a first-reduced set of pre-processed feature values corresponding to a first-reduced set of profile features having a second dimension less than the first dimension; cluster the first-reduced set of pre-processed feature values into at least two subsets of first-reduced feature values, a first subset of first-reduced feature values associated with a first macro-profile tag and a second subset of first-reduced feature values associated with a second macro-profile tag; tag the transaction profile with either the first macro-profile tag or the second macro-profile tag based on the clustering of the first-reduced set of feature values; process the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; cluster the second-reduced set of feature values into a plurality of subsets of the second-reduced feature values, each subset of second-reduced feature values associated with a micro-profile tag corresponding to a unique account profile type; and tag the transaction profile with the micro-profile tag based on the clustering of the second-reduced set of feature values.

In some non-limiting aspects, the at least one computing device is further programmed or configured to determine an ordering of at least two subsets of first-reduced feature values.

According to some non-limiting aspects, the at least one computing device is further programmed or configured to determine an ordering of the plurality of subsets of second-reduced feature values.

In some non-limiting aspects, the first macro-profile tag is associated with transaction profiles having features corresponding to low-threshold purchases, and the second macro-profile tag is associated with transaction profiles having features corresponding to high-threshold purchases.

According to some non-limiting aspects, each account profile type from among the plurality of account profile types is associated with features corresponding to a partially-unique set of behavior characteristics.

In some non-limiting aspects, the at least one computing device is further programmed or configured to: receive an instant transaction; generate at least one feature value for the instant transaction, determine that the at least one feature value does not correspond to a feature associated with the account profile type; and determine that the instant transaction is a suspect transaction based on the determination that the at least one feature value does not correspond to a feature associated with the account profile type.

According to some non-limiting aspects, the at least one computing device is further programmed or configured to: receive an instant transaction; generate at least one feature value for the instant transaction, determine that at least one feature value corresponds to a feature associated with the account profile type; and determine that the instant transaction is not a suspect transaction based on the determination that the at least one feature value corresponds to a feature associated with the account profile type.

In some non-limiting aspects, a computer program product for generating transaction profile tags based on profile transaction activity is disclosed. The computer program product may include at least one non-transitory computer-readable medium including program instructions that, when executed by at least one processor, cause the at least one processor to: receive a transaction profile including a plurality of recorded transactions; associate at least one transaction label from among a plurality of transaction labels with each of the plurality of recorded transactions, each transaction label associated with a transaction type; generate a set of pre-processed feature values corresponding to a set of profile features based on the plurality of recorded transactions from the transaction profile and the transaction labels corresponding to each of the plurality of recorded transactions, the set of profile features having a first dimension; process the set of pre-processed feature values with a macro-encoder to generate a first-reduced set of pre-processed feature values corresponding to a first-reduced set of profile features having a second dimension less than the first dimension; cluster the first-reduced set of pre-processed feature values into at least two subsets of first-reduced feature values, a first subset of first-reduced feature values associated with a first macro-profile tag and a second subset of first-reduced feature values associated with a second macro-profile tag; tag the transaction profile with either the first macro-profile tag or the second macro-profile tag based on the clustering of the first-reduced set of feature values; process the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; cluster the second-reduced set of feature values into a plurality of subsets of second-reduced feature values, each subset of second-reduced feature values associated with a micro-profile tag corresponding to a unique account profile type; and tag the transaction profile with the micro-profile tag based on the clustering of the second-reduced set of feature values.

In some non-limiting aspects, the program instructions, when executed by the at least one processor, further cause the at least one processor to determine an ordering of at least two subsets of first-reduced feature values.

According to some non-limiting aspects, the program instructions, when executed by the at least one processor, further cause the at least one processor to determine an ordering of the plurality of subsets of second-reduced feature values.

In some non-limiting aspects, the first macro-profile tag is associated with transaction profiles having features corresponding to low-threshold purchases, and the second macro-profile tag is associated with transaction profiles having features corresponding to high-threshold purchases.

According to some non-limiting aspects, each account profile type from among the plurality of account profile types is associated with features corresponding to a partially-unique set of behavior characteristics.

In some non-limiting aspects, the program instructions, when executed by the at least one processor, further cause the at least one processor to receive an instant transaction; generate at least one feature value for the instant transaction, determine that the at least one feature value does not correspond to a feature associated with the account profile type; and determine that the instant transaction is a suspect transaction based on the determination that the at least one feature value does not correspond to a feature associated with the account profile type.

According to some non-limiting aspects, the program instructions, when executed by the at least one processor, further cause the at least one processor to receive an instant transaction; generate at least one feature value for the instant transaction, determine that at least one feature value corresponds to a feature associated with the account profile type; and determine that the instant transaction is a not a suspect transaction based on the determination that the at least one feature corresponds to a feature associated with the account profile type.

Clause 1. A method for generating transaction profile tags, the method comprising: receiving, with at least one processor, a transaction profile including a plurality of recorded transactions; associating, with at least one processor, at least one transaction label from among a plurality of transaction labels with each of the plurality of recorded transactions, each transaction label associated with a transaction type; generating, with at least one processor, a set of pre-processed feature values corresponding to a set of profile features based on the plurality of recorded transactions from the transaction profile and the transaction labels corresponding to each of the plurality of recorded transactions, the set of profile features having a first dimension; processing, with at least one processor, the set of pre-processed feature values with a macro-encoder to generate a first-reduced set of pre-processed feature values corresponding to a first-reduced set of profile features having a second dimension less than the first dimension; clustering, with at least one processor, the first-reduced set of pre-processed feature values into at least two subsets of first-reduced feature values, a first subset of first-reduced feature values associated with a first macro-profile tag and a second subset of first-reduced feature values associated with a second macro-profile tag; tagging, with at least one processor, the transaction profile with either the first macro-profile tag or the second macro-profile tag based on the clustering of the first-reduced set of feature values; processing, with at least one processor, the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; clustering, with at least one processor, the second-reduced set of feature values into a plurality of subsets of second-reduced feature values, each subset of second-reduced feature values associated with a micro-profile tag corresponding to a unique account profile type; and tagging, with at least one processor, the transaction profile with the micro-profile tag based on the clustering of the second-reduced set of feature values.

Clause 2. The method according to clause 1, further comprising: determining, with at least one processor, an ordering of at least two subsets of first-reduced feature values.

Clause 3. The method according to clauses 1 or 2, further comprising: determining, with at least one processor, an ordering of the plurality of subsets of second-reduced feature values.

Clause 4. The method according to any of clauses 1-3, wherein the first macro-profile tag is associated with transaction profiles having features corresponding to low-threshold purchases, and the second macro-profile tag is associated with transaction profiles having features corresponding to high-threshold purchases.

Clause 5. The method according to any of clauses 1-4, wherein each account profile type from among a plurality of account profile types is associated with features corresponding to a partially-unique set of behavior characteristics.

Clause 6. The method according to any of clauses 1-5, further comprising: receiving, with at least one processor, an instant transaction; generating, with at least one processor, at least one feature value for the instant transaction; determining, with at least one processor, that the at least one feature value does not correspond to a feature associated with the account profile type; and determining, with at least one processor, that the instant transaction is a suspect transaction based on the determination that the at least one feature value does not correspond to a feature associated with the account profile type.

Clause 7. The method according to any of clauses 1-6, further comprising: receiving, with at least one processor, an instant transaction; generating, with at least one processor, at least one feature value for the instant transaction; determining, with at least one processor, that the at least one feature value corresponds to a feature associated with the account profile type; and determining, with at least one processor, that the instant transaction is a non-suspect transaction based on the determination that the at least one feature value corresponds to a feature associated with the account profile type.

Clause 8. A system for generating transaction profile tags, the system comprising: at least one processor programmed or configured to: receive, with at least one processor, a transaction profile including a plurality of recorded transactions; associate, with at least one processor, at least one transaction label from among a plurality of transaction labels with each of the plurality of recorded transactions, each transaction label associated with a transaction type; generate, with at least one processor, a set of pre-processed feature values corresponding to a set of profile features based on the plurality of recorded transactions from the transaction profile and the transaction labels corresponding to each of the plurality of recorded transactions, the set of profile features having a first dimension; process, with at least one processor, the set of pre-processed feature values with a macro-encoder to generate a first-reduced set of pre-processed feature values corresponding to a first-reduced set of profile features having a second dimension less than the first dimension; cluster, with at least one processor, the first-reduced set of pre-processed feature values into at least two subsets of first-reduced feature values, a first subset of first-reduced feature values associated with a first macro-profile tag and a second subset of first-reduced feature values associated with a second macro-profile tag; tag, with at least one processor, the transaction profile with either the first macro-profile tag or the second macro-profile tag based on the clustering of the first-reduced set of feature values; process, with at least one processor, the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; cluster, with at least one processor, the second-reduced set of feature values into a plurality of subsets of second-reduced feature values, each subset of second-reduced feature values associated with a micro-profile tag corresponding to a unique account profile type; and tag, with at least one processor, the transaction profile with the micro-profile tag based on the clustering of the second-reduced set of feature values.

Clause 9. The system according to clause 8, wherein the at least one computing device is further programmed or configured to: determine, with at least one processor, an ordering of at least two subsets of first-reduced feature values.

Clause 10. The system according to clauses 8 or 9, wherein the at least one computing device is further programmed or configured to: determine, with at least one processor, an ordering of the plurality of subsets of second-reduced feature values.

Clause 11. The system according to any of clauses 8-10, wherein the first macro-profile tag is associated with transaction profiles having features corresponding to low-threshold purchases, and the second macro-profile tag is associated with transaction profiles having features corresponding to high-threshold purchases.

Clause 12. The system according to clauses 8-11, wherein each account profile type from among a plurality of account profile types is associated with features corresponding to a partially-unique set of behavior characteristics.

Clause 13. The system according to clauses 8-12, wherein the at least one computing device is further programmed or configured to: receive, with at least one processor, an instant transaction; generate, with at least one processor, at least one feature value for the instant transaction; determine, with at least one processor that the at least one feature value does not correspond to a feature associated with the account profile type; and determine, with at least one processor, that the instant transaction is a suspect transaction based on the determination that the at least one feature value does not correspond to a feature associated with the account profile type.

Clause 14. The system according to clauses 8-13, wherein the at least one computing device is further programmed or configured to: receive, with at least one processor, an instant transaction; generate, with at least one processor, at least one feature value for the instant transaction; determine, with at least one processor, that the at least one feature value corresponds to a feature associated with the account profile type; and determine, with at least one processor, that the instant transaction is a non-suspect transaction based on the determination that the at least one feature value corresponds to a feature associated with the account profile type.

Clause 15. A computer program product for generating transaction profile tags based on transaction profile activity comprising at least one non-transitory computer-readable medium including program instructions that, when executed by at least one processor, cause the at least one processor to: receive, with at least one processor, a transaction profile including a plurality of recorded transactions; associate, with at least one processor, at least one transaction label from among a plurality of transaction labels with each of the plurality of recorded transactions, each transaction label associated with a transaction type; generate, with at least one processor, a set of pre-processed feature values corresponding to a set of profile features based on the plurality of recorded transactions from the transaction profile and the transaction labels corresponding to each of the plurality of recorded transactions, the set of profile features having a first dimension; process, with at least one processor, the set of pre-processed feature values with a macro-encoder to generate a first-reduced set of pre-processed feature values corresponding to a first-reduced set of profile features having a second dimension less than the first dimension; cluster, with at least one processor, the first-reduced set of pre-processed feature values into at least two subsets of first-reduced feature values, a first subset of first-reduced feature values associated with a first macro-profile tag and a second subset of first-reduced feature values associated with a second macro-profile tag; tag, with at least one processor, the transaction profile with either the first macro-profile tag or the second macro-profile tag based on the clustering of the first-reduced set of feature values; process, with at least one processor, the set of pre-processed feature values with a micro-encoder selected from among a plurality of micro-encoders to generate a second-reduced set of pre-processed feature values, the micro-encoder selected based on the tagging of the transaction profile with either the first macro-profile tag or the second macro-profile tag; cluster, with at least one processor, the second-reduced set of feature values into a plurality of subsets of second-reduced feature values, each subset of second-reduced feature values associated with a micro-profile tag corresponding to a unique account profile type; and tag, with at least one processor, the transaction profile with the micro-profile tag based on the clustering of the second-reduced set of feature values.

Clause 16. The computer program product according to clause 15, wherein the program instructions, when executed by the at least one processor, further cause the at least one processor to: determine, with at least one processor, an ordering of at least two subsets of first-reduced feature values.

Clause 17. The computer program product according to clauses 15 or 16, wherein the program instructions, when executed by the at least one processor, further cause the at least one processor to: determine, with at least one processor, an ordering of the plurality of subsets of second-reduced feature values.

Clause 18. The computer program product according to any of clauses 15-17, wherein the first macro-profile tag is associated with transaction profiles having features corresponding to low-threshold purchases, and the second macro-profile tag is associated with transaction profiles having features corresponding to high-threshold purchases.

Clause 19. The computer program product according to any of clauses 15-18, wherein each account profile type from among a plurality of account profile types is associated with features corresponding to a partially-unique set of behavior characteristics.

Clause 20. The computer program product according to any of clauses 15-19, wherein the program instructions, when executed by the at least one processor, further cause the at least one processor to: receive, with at least one processor, an instant transaction; generate, with at least one processor, at least one feature value for the instant transaction; determine, with at least one processor, that the at least one feature value does not correspond to a feature associated with the account profile type; and determine, with at least one processor, that the instant transaction is a suspect transaction based on the determination that the at least one feature value does not correspond to a feature associated with the account profile type.

Clause 21. The computer program product according to any of clauses 15-20, wherein the program instructions, when executed by the at least one processor, further cause the at least one processor to: receive an instant transaction; generate at least one feature value for the instant transaction; determine that at least one feature value corresponds to a feature associated with the account profile type; and determine that the instant transaction is not a suspect transaction based on the determination that the at least one feature value corresponds to a feature associated with the account profile type.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DETAILED DESCRIPTION

Figure 1:
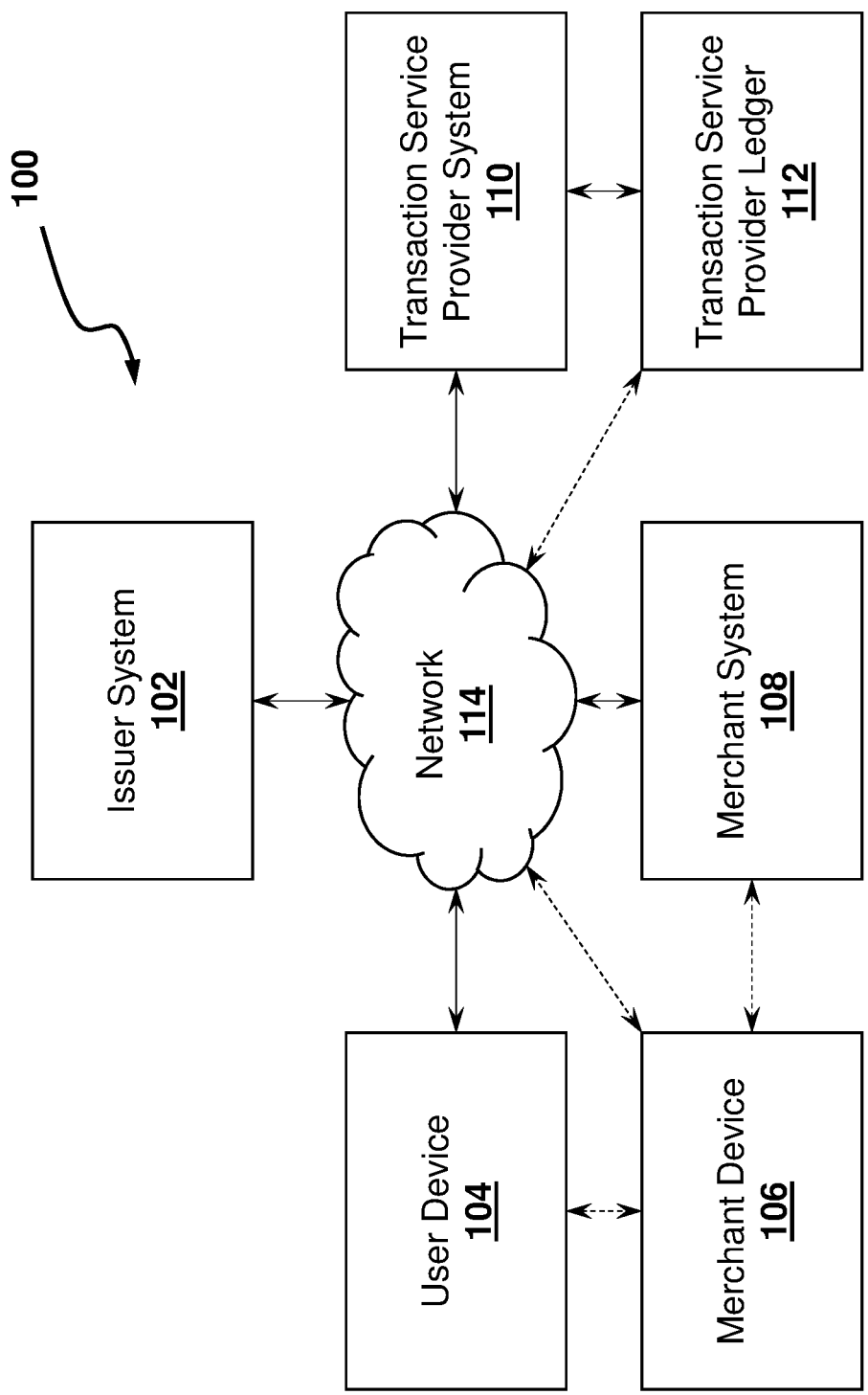
FIG. 1 is a schematic diagram of a system for generating profile tags.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the terms "issuer institution," "payment device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument (e.g., a payment card), and/or may be electronic and used for electronic payments. In some non-limiting embodiments, an issuer institution may be associated with a bank identification number (BIN) that uniquely identifies the issuer institution. As used herein, the term "issuer institution system" may refer to one or more computer systems operated by or on behalf of an issuer institution, such as a server executing one or more software applications. For example, an issuer institution system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment instrument (e.g., a payment card, a credit card, a debit card, and/or the like) and/or may be electronic information transmitted to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet application, a personal digital assistant (PDA), a pager, a security card, a computer, an access card, a wireless terminal, and/or a transponder, as examples. The payment device may include a volatile or a non-volatile memory to store information (e.g., an account identifier, a name of the account holder, and/or the like).

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to methods, systems, and computer program products for generating profile tags based on profile transaction activity. In some non-limiting embodiments or aspects, a computer-implemented method for generating profile tags based on profile transaction activity includes receiving, with at least one processor, a transaction profile including a plurality of recorded transactions. The method may include associating, with at least one processor, at least one transaction label from among a plurality of transaction labels with each of the plurality of recorded transactions, each transaction label associated with a transaction type. The method may include generating, with at least one processor, a set of profile features based on the plurality of recorded transactions from the transaction profile, the set of profile features having a first dimension. The method may include encoding, with at least one processor, the set of profile features of the transaction profile with a macro-encoder into a first-reduced set of profile features, the first-reduced set of profile features having a second dimension less than the first dimension. The method may further include clustering, with at least one processor, the first-reduced set of profile features into at least two subsets of first-reduced profile features, a first subset of first-reduced profile features associated with a first macro-profile tag and a second subset of first-reduced profile features associated with a second macro-profile tag. The method may include tagging, with at least one processor, the transaction profile with either the first macro-profile tag or the second macro-profile tag based on the clustering of the first-reduced set of profile features. The method may include encoding, with at least one processor, the set of profile features of the transaction profile with a micro-encoder from among a plurality of micro-encoders into a second-reduced set of profile features, the micro-encoder selected based on tagging the transaction profile with either the first macro-profile tag or the second macro-profile tag. The method may include clustering, with at least one processor, the second-reduced set of profile features into a plurality of subsets of second-reduced profile features, each subset of second-reduced profile features associated with an account profile type. The method may include tagging, with at least one processor, the transaction profile with a tag associated with an account profile type from among a plurality of account profile types based on the clustering of the second-reduced set of profile features.

In this way, non-limiting embodiments of the present disclosure provide methods of generating transaction profile tags that may enable one or more systems to identify a transaction as a fraudulent transaction. For example, after a transaction profile of an account is tagged as being associated with a profile type, subsequent transactions may be matched against profile criteria associated with the particular profile type (e.g., by a transaction service provider system). As a result, the subsequent transactions may be compared to the particular profile type, and action may be taken based on the comparison (e.g., a transaction service provider system may process the payment transaction, a transaction service provider system may forego processing the payment transaction, and/or the like). This action may be taken prior to transmission of data associated with the transaction to one or more systems involved in processing the transaction (e.g., the transaction service provider system may determine whether action will be taken prior to transmitting data associated with the transaction to an issuer system). Taking this action, in turn, may reduce computational resource consumption and network communication (e.g., by the issuer system) by virtue of the comparison of the subsequently received transaction to the particular profile type.

Additionally, transactions that are criteria dependent (e.g., time dependent, transaction value dependent, etc.) may be identified as possibly fraudulent or not fraudulent based on the criteria associated with the tagged profile type. This may be particularly useful where an individual account does not yet have enough transaction data to infer whether subsequent transactions are or are not likely to be fraudulent. For example, a college student who just started their classwork at a university may not have enough recorded transactions associated with their transaction profile to later determine that transactions associated with the purchase flight tickets to return home for a holiday or during a break period are fraudulent or non-fraudulent. However, by tagging the account with the profile tag associated with a college student profile, entities such as transaction service providers may, as they process a transaction for a flight ticket purchase initiated in association with the transaction profile of the college student, compare the transaction to the profile tag and, based on the association and known transaction types that are further associated with the profile tag, approve the transaction. As a result, less false-positive fraud identifications are made, thereby decreasing the processing time, computational resources, and network communication necessary to process transactions that may unintentionally identified as fraudulent.

Referring now to FIG. 1, FIG. 1 is a system 100 for generating transaction profile tags as shown according to a non-limiting embodiment. As shown, system 100 includes issuer system 102, user device 104, merchant device 106, merchant system 108, transaction service provider system 110, and transaction service provider ledger 112. Issuer system 102, user device 104, merchant device 106, merchant system 108, transaction service provider system 110, and/or transaction service provider ledger 112 may interconnect (e.g., establish a connection to directly or operably communicate) via wired connections, wireless connections, or a combination of wired and wireless connections, to any or all of the corresponding components of system 100. In some non-limiting embodiments or aspects, operable communication may be established between the devices of system 100 by communicating via an intermediate device or system.

With continued reference to FIG. 1, issuer system 102 may include one or more devices capable of transmitting and/or receiving information to and/or from user device 104, merchant device 106, merchant system 108, transaction service provider system 110, and/or transaction service provider ledger 112 via network 114. For example, issuer system 102 may include one or more computing devices, such as a server (e.g., a transaction processing server), a group of servers, and/or other similar devices. In some non-limiting embodiments or aspects, issuer system 102 may be associated with an issuer institution that issued a credit account, debit account, credit card, debit card, and/or the like to a user associated with user device 104.

User device 104 may include one or more devices capable of transmitting and/or receiving information to and/or from issuer system 102, merchant device 106, merchant system 108, transaction service provider system 110, and/or transaction service provider ledger 112 via network 114. For example, user device 104 may include a payment device, one or more computing devices, and/or any other system or device configured to initiate and/or participate in a transaction. In some non-limiting embodiments or aspects, user device 104 may interconnect (e.g., establish a connection to communicate) with merchant device 106 and/or merchant system 108 via wired connections, wireless connections, or a combination of wired and wireless connections. In some non-limiting embodiments or aspects, user device 104 may be part of merchant device 106 and/or merchant system 108, such as one or more components of a point-of-sale (POS) system. In some non-limiting embodiments or aspects, user device 104 may be capable of receiving information (e.g., from merchant device 106, merchant system 108, and/or transaction service provider system 110, etc.) via a short range wireless communication connection (e.g., a near-field communication (NFC) connection, a radio frequency identification (RFID) communication connection, a Bluetooth® communication connection, and/or the like) or any other form of communication (e.g., a communication routed through a hub or server), or any other form of communication. User device 104 may be associated with a party to a transaction, such as an individual or entity associated with a credit account, debit account, credit card, debit card, and/or the like.

Merchant device 106 may include one or more devices capable of transmitting and/or receiving information to and/or from issuer system 102, user device 104, merchant system 108, transaction service provider system 110 and/or transaction service provider ledger 112 via network 114 and/or via a local connection (e.g., a short range wireless communication connection such as a NFC connection, a RFID communication connection, a Bluetooth® communication connection, and/or the like). For example, merchant device 106 may include a physical device (e.g., an NFC tag), one or more computing devices, portable computers, tablet computers, cellular phones, smartphones, wearable devices (e.g., watches, glasses, lenses, clothing and/or the like), PDAs, and/or the like. Merchant device 106 may interconnect (e.g., establish a connection to communicate) with merchant system 108 via wired connections, wireless connections, or a combination of wired and wireless connections. In some non-limiting embodiments or aspects, merchant device 106 may be capable of transmitting and/or receiving information (e.g., from user device 104 and/or merchant system 108) via a short range wireless communication connection (e.g., NFC connection, a RFID communication connection, a Bluetooth® communication connection, and/or the like) and/or communicating information (e.g., to user device 104 and/or merchant system 108) via a short range wireless communication connection.

Merchant system 108 may include one or more systems or devices capable of transmitting and/or receiving information to and/or from issuer system 102, user device 104, merchant device 106, transaction service provider system 110, and transaction service provider ledger 112 via network 114. For example, merchant system 108 may include one or more computing devices, such as one or more servers, one or more point-of-sale (POS) systems, and/or other like systems or devices. In some non-limiting embodiments or aspects, merchant system 108 may include a device capable of communicating and/or receiving information from user device 104 and/or merchant device 106 via a network (e.g., network 114) and/or a wireless communication connection (e.g., a NFC connection, a RFID communication connection, a Bluetooth® communication connection, and/or the like). In some non-limiting embodiments or aspects, merchant system 108 may include one or more merchant devices 106 and/or user devices 104. For example, merchant system 108 may include user devices 104 and/or merchant devices 106 that allow a merchant to communicate information to transaction service provider system 110 and/or transaction service provider ledger 112. In some non-limiting embodiments or aspects, merchant system 108 may include one or more devices, such as computers, computing devices, computer systems, and/or peripheral devices capable of being used by a merchant to conduct a payment transaction with a user.

Transaction service provider system 110 may include one or more devices capable of transmitting and/or receiving information to and/or from issuer system 102, user device 104, merchant device 106, merchant system 108, and transaction service provider ledger 112 via network 114. For example, transaction service provider system 110 may include one or more computing devices, such as a server, a group of servers, and/or other like devices. In some non-limiting embodiments or aspects, transaction service provider system 110 may be associated with a financial institution (e.g., an issuer institution) and/or a transaction service provider, as described herein.

Transaction service provider ledger 112 may include one or more devices capable of transmitting and/or receiving information to and/or from issuer system 102, user device 104, merchant device 106, merchant system 108, and transaction service provider system 110 via network 114. For example, transaction service provider ledger 112 may include one or more computing devices, such as a server, a group of servers, and/or other like devices. In some non-limiting embodiments or aspects, transaction service provider ledger 112 may be associated with a financial institution (e.g., an issuer institution) and/or a transaction service provider, as described herein. In some non-limiting embodiments or aspects, transaction service provider ledger 112 may be configured to communicate solely through transaction service provider system 110, issuer system 102, and/or merchant system 108.

Network 114 may include one or more wired and/or wireless networks. For example, network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks illustrated by FIG. 1 are provided as an example. There may be additional systems, devices, and/or networks, fewer systems, devices, and/or networks, different systems, devices, and/or networks, or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems or devices (e.g., one or more systems or devices) of system 100 for generating transaction profile tags based on profile transaction activity may perform one or more functions described as being performed by another set of systems or devices of system 100.

Figure 2:
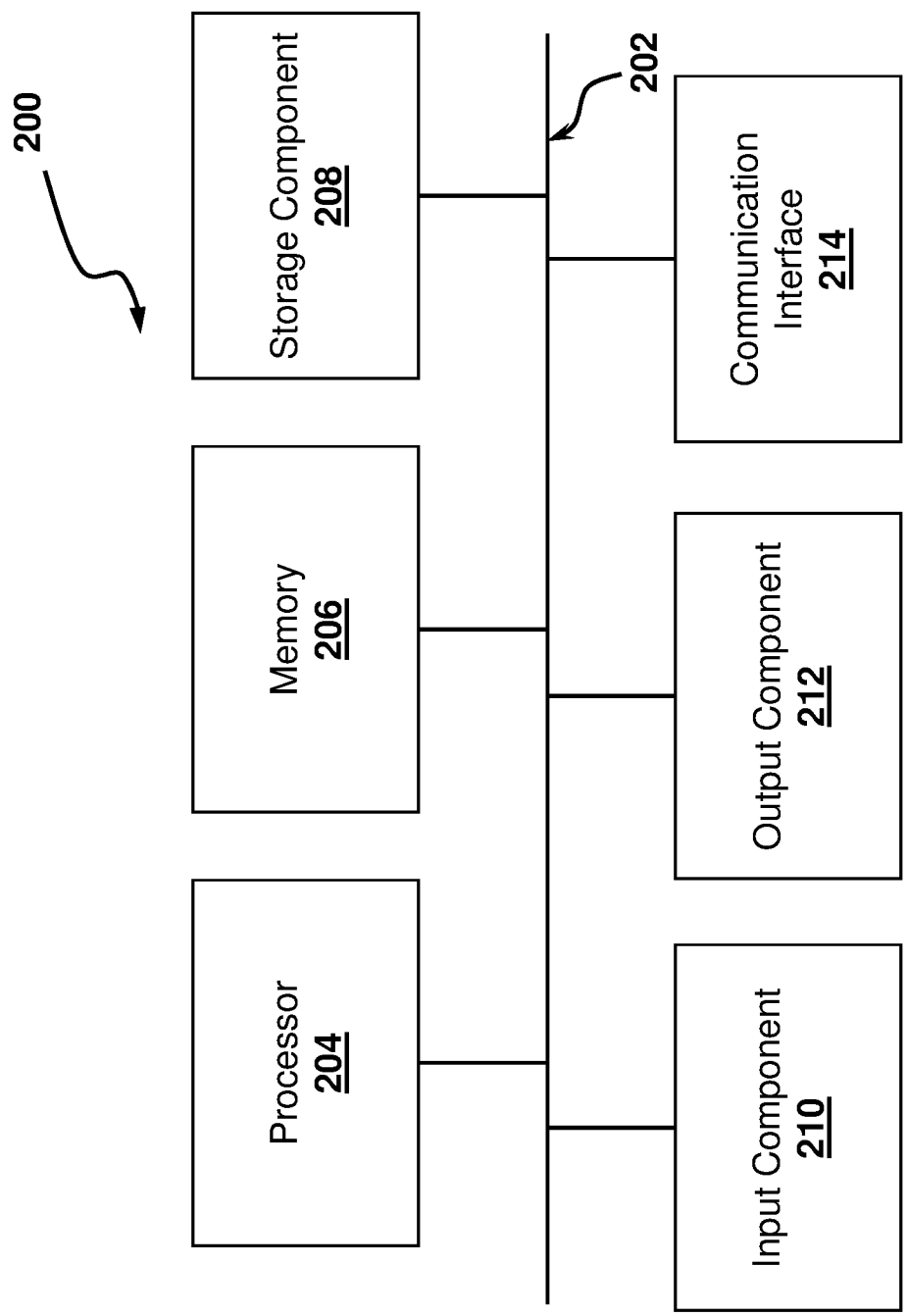
FIG. 2 is a diagram of a non-limiting embodiment of components of one or more devices of FIG. 1.

Referring now to FIG. 2, FIG. 2 is a diagram of a device 200 having multiple components for generating transaction profile tags. Device 200 may correspond to one or more devices of issuer system 102 (e.g., one or more devices of a system of issuer system 102), one or more devices of user device 104 (e.g., one or more devices of a system of user device 104), one or more devices of merchant device 106 (e.g., one or more devices of a system of merchant device 106), one or more devices of merchant system 108 (e.g., one or more devices of a system of merchant system 108), one or more devices of transaction service provider system 110 (e.g., one or more devices of a system of transaction service provider system 110), one or more devices of transaction service provider ledger 112 (e.g., one or more devices of a system of transaction service provider ledger 112), and/or one or more devices of network 114 (e.g., one or more devices of a system of network 114). In some non-limiting embodiments or aspects, one or more devices of issuer system 102, one or more devices of user device 104, one or more devices of merchant device 106, one or more devices of merchant system 108, one or more devices of transaction service provider system 110, one or more devices of transaction service provider ledger 112, and/or one or more devices of network 114 may include at least one of device 200 or at least one component of device 200. As illustrated by FIG. 2, device 200 may include bus 202, processor 204, memory 206, a storage component 208, input component 210, output component 212, and communication interface 214.

Bus 202 may include a component that permits communication between the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA) and/or an application-specific integrated circuit (ASIC), etc.) that can be programmed to perform one or more functions. The memory 206 may include random access memory (RAM), read-only memory (ROM), and/or another type of dynamic or static storage device (e.g., flash memory, magnetic memory, optical memory, etc.) that stores information and/or instructions for use and/or execution on processor 204.

Storage component 208 may store information and/or software (e.g., executable instructions) related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a speaker, one or more light-emitting diodes (LEDs), etc.

Communication interface 214 may include a transceiver-like component (e.g., a transceiver, a separate receiver and transmitter, etc.) that enables device 200 to communicate with other devices, such as via wired connections, wireless connections, or a combination of wired and wireless connections. Communication interface 214 may enable device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, an NFC interface, a cellular network interface, and/or the like.

Device 200 may perform one or more processes described herein. For example, device 200 may perform processes by executing software instructions on processor 204. The software instructions may be stored in a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

The software instructions may be read into memory 206 and/or storage component 208 from another computer-readable medium from another device via communication interface 214. When executed, the software instructions stored in the memory 206 and/or storage component 208 may cause processor 204 to perform one or more processes described herein. Additionally or alternatively, hardwired circuitry may be used in place of, or in combination with, software instructions to perform one or more of the processes described herein. Thus, embodiments described herein are not limited to any specific combination of hardware circuitry and/or software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
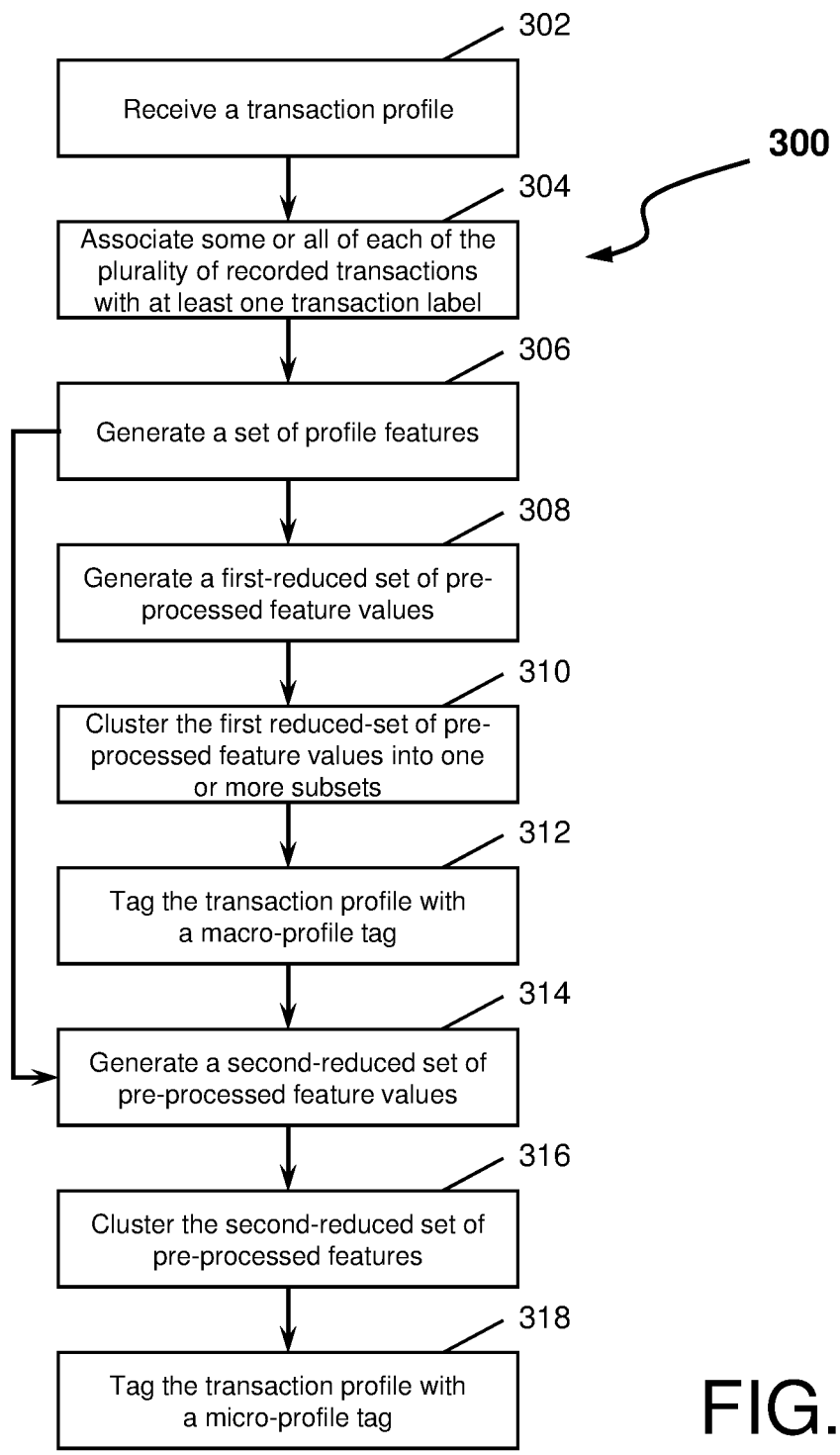
FIG. 3 is a flow diagram of a process for generating transaction profile tags.

Referring now to FIG. 3, FIG. 3 is a sequence diagram for a non-limiting example of process 300 for generating transaction profile tags. In some non-limiting embodiments or aspects, one or more of the functions described with respect to process 300 may performed (e.g., completely, partially, etc.) by transaction service provider system 110. In some non-limiting embodiments or aspects, one or more of the steps of process 300 may be performed (e.g., completely, partially, and/or the like) by another device or a group of devices separate from and/or including transaction service provider system 110 such as issuer system 102, user device 104, merchant device 106, merchant system 108, transaction service provider system 110, and/or transaction service provider ledger 112.

With continued reference to FIG. 3, in some non-limiting embodiments or aspects, a transaction profile may be received (block 302). For example, transaction service provider system 110 may receive a transaction profile. Transaction service provider system 110 may associate some or all of each of the plurality of recorded transactions (e.g., transactions) with at least one transaction label (block 304). For example, transaction service provider system 110 may associate some or all of each of the plurality of recorded transactions with at least one transaction label from among a plurality of transaction labels. Each transaction label may be associated with a transaction type (e.g., a cross-border label may correspond to transactions where an issuer and a merchant are located in different countries, a morning transaction label may be associated with transactions that occurs before 7:00 AM, and/or the like).

In some non-limiting embodiments or aspects, a set of profile features may be generated (block 306). For example, transaction service provider system 110 may generate a set of profile features based on the plurality of recorded transactions from the transaction profile. In some non-limiting embodiments or aspects, the set of profile features may be associated with attributes selected during model generation. In some non-limiting embodiments or aspects, attributes (e.g., attributes of a transaction) may include, for example, a type of merchant associated with a transaction, a time of day associated with a transaction, a location associated with a transaction, whether the transaction associated with the location was initiated online or at a physical location, and/or the like. In some non-limiting embodiments or aspects, the set of profile features may include a first dimension (e.g., a quantity of features included in the set of profile features). In some non-limiting embodiments or aspects, a set of attributes may be selected to later generate features (e.g., profile features, features of a first-reduced set of pre-processed features, as described herein, features of a second-reduced set of pre-processed features, as described herein, and/or the like), the features including, without limitation, a percent of the sum of a set of specific transaction values compared to the sum of all transaction values associated with the transaction profile, a total amount of transactions having a particular label from among the plurality of recorded transactions, and/or the like. For example, transaction service provider system 110 may select a set of attributes to later generate features, as described herein. In some non-limiting embodiments or aspects, transaction data (e.g., transaction data associated with one or more recorded transactions) may be pre-processed based on attributes selected during model generation to derive a set of features (e.g., a set of profile features) and corresponding values (e.g., a set of pre-processed feature values). For example, transaction service provider system 110 may pre-process transaction data based on attributes of one or more transactions associated with the transaction data.

In some non-limiting embodiments or aspects, a first-reduced set of pre-processed feature values may be generated (block 308). For example, transaction service provider system 110 may generate a first-reduced set of pre-processed feature values. The first-reduced set of pre-processed feature values may be associated with a first-reduced set of pre-processed features. In some non-limiting embodiments or aspects, a set of pre-processed feature values associated with a set of profile features (e.g., a set of feature values corresponding to the set of generated profile features) may be processed with a macro-encoder to generate a first-reduced set of pre-processed feature values associated with a first-reduced set of pre-processed features (e.g., a first-reduced set of profile feature values corresponding to a first-reduced set of profile features). The first-reduced set of pre-processed features may include a second dimension less than, greater than, or equal to the first dimension.

In some non-limiting embodiments or aspects, the first-reduced set of pre-processed feature values may be clustered into one or more subsets (block 310) For example, the first-reduced set of pre-processed feature values may be clustered into at least two subsets of first-reduced feature values (e.g., at least two subsets of first-reduced feature values associated with at least two subsets of first-reduced features) or, in some embodiments, a plurality of subsets of first-reduced feature values. In some non-limiting embodiments or aspects, transaction service provider system 110 may cluster the first-reduced set of pre-processed feature values into one or more subsets of first-reduced feature values. Clustering may be performed by any clustering means such as, for example, K-means clustering, Mean-Shift clustering, Density-Based Spatial Clustering of Applications with Noise, Expectation-Maximization (EM) clustering using Gaussian Mixture Models, Hierarchical Clustering, and/or the like. For example, the subsets of first-reduced profile features (e.g., one or more subsets of first-reduced feature values such as the first subset of first-reduced feature values, the second subset of first-reduced feature values, and/or the like) may be clustered based on the value of transactions associated with the first-reduced set of pre-processed profile features, the sum of the value of the transactions associated with a particular profile feature, and/or the like. In some non-limiting embodiments or aspects, the subsets of first-reduced profile features may be clustered based on whether the value of transactions associated with the transactions are included within one or more predetermined ranges (e.g., a high-value transaction range associated with high-value transactions such as transactions with values above a high threshold value, a medium-value transaction range associated with medium-value transactions with values less than the high threshold value but greater than a low threshold value, a low-value transaction range associated with low-value transactions with values less than the low threshold value, and/or the like). Additionally or alternatively, the first-reduced set of pre-processed feature values may be clustered based on labels corresponding to each profile feature (e.g., each profile feature of the first-reduced set of pre-processed features associated with each feature value of the first-reduced set of pre-processed feature values and/or the like). In some non-limiting embodiments or aspects, combinations of profile features may be analyzed during clustering.

In some non-limiting embodiments or aspects, the transaction profile may be tagged with a macro-profile tag (block 312). For example, once clustered, transaction service provider system 110 may associate a macro-profile tag with the transaction profile based on the resulting clusters of the first-reduced profile features (e.g., based on the at least two subsets of first-reduced feature values). In such an example, where one or more of the features have feature values that correspond to or are associated with high-value transactions (e.g., one or more transactions associated with values above and/or equal to a threshold), the transaction profile may be associated with (e.g., tagged with) a high-value profile tag. Additionally or alternatively, where one or more of the features are associated with low-value transactions (e.g., one or more transactions associated with values below and/or equal to a threshold) the transaction profile may be tagged as being associated with a low-value profile tag. In some non-limiting embodiments or aspects, the macro-profile tag may be associated with predetermined criteria. For example, if the total value of all purchases associated with a transaction profile is greater than a predetermined spending threshold associated with a low-value profile, but less than a predetermined spending threshold associated with a high-value profile, the transaction profile may be tagged with a medium-value profile tag.

In some non-limiting embodiments or aspects, a second-reduced set of pre-processed feature values may be generated (block 314). For example, the set of pre-processed feature values associated with the set of profile features may be processed with a micro-encoder selected from among a plurality of micro-encoders to generate a second-reduced set of profile features. Each second-reduced profile feature (e.g., of the second-reduced set of pre-processed features) may be associated with a second-reduced feature value (e.g., of a second-reduced set of pre-processed feature values associated with the second-reduced set of pre-processed features). The micro-encoder used to process the feature values associated with the selected set of profile features and generate the second-reduced set of profile features may be selected based on the macro-profile tag associated with the transaction profile. The second-reduced set of profile features may have a third dimension less than, greater than, or equal to the first dimension and/or the second dimension.

In some non-limiting embodiments or aspects, the second-reduced set of pre-processed feature values may be clustered (block 316). For example, the second-reduced set of pre-processed feature values may be clustered into at least two subsets of second-reduced feature values or, in some embodiments, a plurality of subsets of second-reduced feature values. For example, the subsets of second-reduced profile features may be clustered based on determining a relationship between the total transaction value associated with one or more features and the sum of all the initial transaction values. The clusters may then be ordered (e.g., clusters may be assigned a rank based on the number of features incorporated in the cluster, the total value of the features associated with each cluster, and/or the like).

In some non-limiting embodiments or aspects, a micro-profile tag may be associated with (e.g., tagged with) the transaction profile (block 318). For example, a micro-profile tag may be associated with the transaction profile based on the clustering and/or the ordering of the clusters. In some non-limiting embodiments or aspects, one or more of the second-reduced pre-processed features may be associated with purchases that are expected purchases of a first profile type (e.g., purchases that are made one or more classes of merchants, at one or more times of day, and/or the like). For example, transaction service provider system 110 may determine that one or more of the second-reduced pre-processed features are associated with purchases that are expected purchases of the first profile type. Transaction service provider system 110 may then associate the transaction profile with a first profile type tag. Additionally or alternatively, transaction service provider system 110 may determine that one or more of the second-reduced features (e.g., one or more features of the second-reduced set of pre-processed features) are associated with one or more expected purchases of a second profile type. For example, transaction service provider system 110 may determine that one or more of the second-reduced features are associated with one or more expected purchases of a second profile type and transaction service provider system 110 may associate the transaction profile with a second profile type tag different from the first profile type tag. By virtue of these associations of a transaction profile with a micro-profile tag, later transactions may be analyzed, both in view of the transactions initiated by the individual and transactions identified as typically associated with the micro-profile tag, to identify appropriate actions to take (e.g., to process the later transactions and/or forego processing the later transactions) based on the recorded transactions.

It will be understood that clustering the subsets of first-reduced profile features and/or the subsets of second-reduced profile features may include ordering the profile features associated with each subset of reduced profile features, respectively. For example, the first-reduced set of profile features may be ordered by transaction value. Once ordered, the mean value and/or the median value may be identified to determine whether the majority and/or the average of the transaction values is associated with high-value transactions, medium-value transactions, low-value transactions, and/or the like. Similarly, the second-reduced set of profile features may be ordered based on one or more attributes. For example, the second-reduced set of pre-processed features may be ordered by their associated location (e.g., features associated with purchases within a predetermined distance from a home of an individual, a workplace of an individual, and/or the like), a time of day and/or the week associated with the transaction, the frequency with which certain transactions occur within a particular location or region, and/or the like. Ordering of the second-reduced set of pre-processed features may also occur based on a hierarchy associated with the one or more attributes. For example, the profile features of the second-reduced set of pre-processed features may be ordered based first on their location, and then further based on merchant types associated with the profile features. In some non-limiting embodiments or aspects, multiple orderings may be performed based on the existence of multiple hierarchies and the ordering from the most successful hierarchy (e.g., the ordering associated with a particular hierarchy that includes the largest cluster and/or clusters). In some non-limiting embodiments or aspects, features that are clustered and/or ordered may be analyzed to determine if they satisfy certain micro-profile criteria. For example, where spending associated with a particular type of merchant (e.g., grocery stores, home improvement stores, and/or the like) for a particular transaction profile satisfies the criteria (e.g., satisfies a predetermined threshold), the transaction profile may be tagged with one or more micro-profile tags.

In some non-limiting embodiments or aspects, the existence of certain features may be unique to a particular macro or micro-profile tag. For example, frequent transactions including airline tickets and automobile rentals may be associated with a micro-profile tag that represents a transaction profile of a professional, whereas such transactions would be atypical of a transaction profile of a college student. Additionally or alternatively, transactions at a university may be associated with a transaction profile of a college student, whereas such transactions would be atypical of a transaction profile of a professional. As such, some or all of the macro or micro-profile tags may be associated with features that, if present, are dispositive with regard to selection of a macro or micro-profile tag to be associated with the transaction profile.

In some non-limiting embodiments or aspects, once a micro-profile tag is associated with a transaction profile, subsequent transactions may be compared to the micro-profile tag and, based on the comparison, the subsequent transaction(s) may be identified as fraudulent, possibly fraudulent, and/or non-fraudulent. For example, if a micro-profile tag associated with a college student is tagged to a transaction profile, subsequent transactions may be compared to the micro-profile tag to determine whether the transactions are fraudulent, possibly fraudulent, and/or non-fraudulent.

It will be understood that certain transactions may, when analyzed solely in regard to the transactions associated with the transaction profile (e.g., based on the macro-profile tag associated with the transaction profile) be flagged as fraudulent absent comparison of the certain transactions to the micro-profile tag associated with the transaction. For example, a transaction profile associated with an individual entering a university may not be associated with any purchases at a university bookstore but may be associated with tuition payments and/or other college-related expenses. As a result, by way of the association of the transaction profile of the college student with a micro-profile tag associated with college students, transactions initiated by the college student that may have been otherwise denied (e.g., because the purchase value may have been too high of typical purchases of the transaction profile of the college student, such as the purchase of textbooks) may be authorized. In this way, the resources needed to verify transactions for each transaction associated with each individual transaction profile may be processed and approved or denied with a greater level of certainty with regard to transactions not typical of that individual, but typical of the transactions of individuals similar. Additionally, resources may be conserved where a transaction is flagged as fraudulent based on a macro-profile tag but then later confirmed as non-fraudulent based on a micro-profile tag.

While reference has been made with respect to the description of process 300 to a given transaction profile, a plurality of transaction profiles may be analyzed to generate the macro-encoder and/or the plurality of micro-encoders. For example, a plurality of transaction profiles may be tagged with respective macro-profile tags and/or micro-profile tags. More particularly, during supervised learning, one or more of the transaction profiles may be tagged with macro and/or micro-profile tags (e.g., based on input received by transaction service provider system 110), during semi-supervised learning, some of the transaction profiles may be tagged with macro and/or micro-profile tags, and during unsupervised learning, none of the transaction profiles may be tagged with macro and/or micro-profile tags. The transaction profiles may then be analyzed and used to train the macro-encoder. Subsets of the transaction profiles may be used to train micro-encoders associated with respective micro-profile tags. The macro-encoder and/or micro-encoders may then, once trained, be validated by analyzing a different plurality of transaction profiles. The validated macro and/or micro-encoders may then be used, as described above, to associate tags with individual transaction profiles.

Figure 4A:
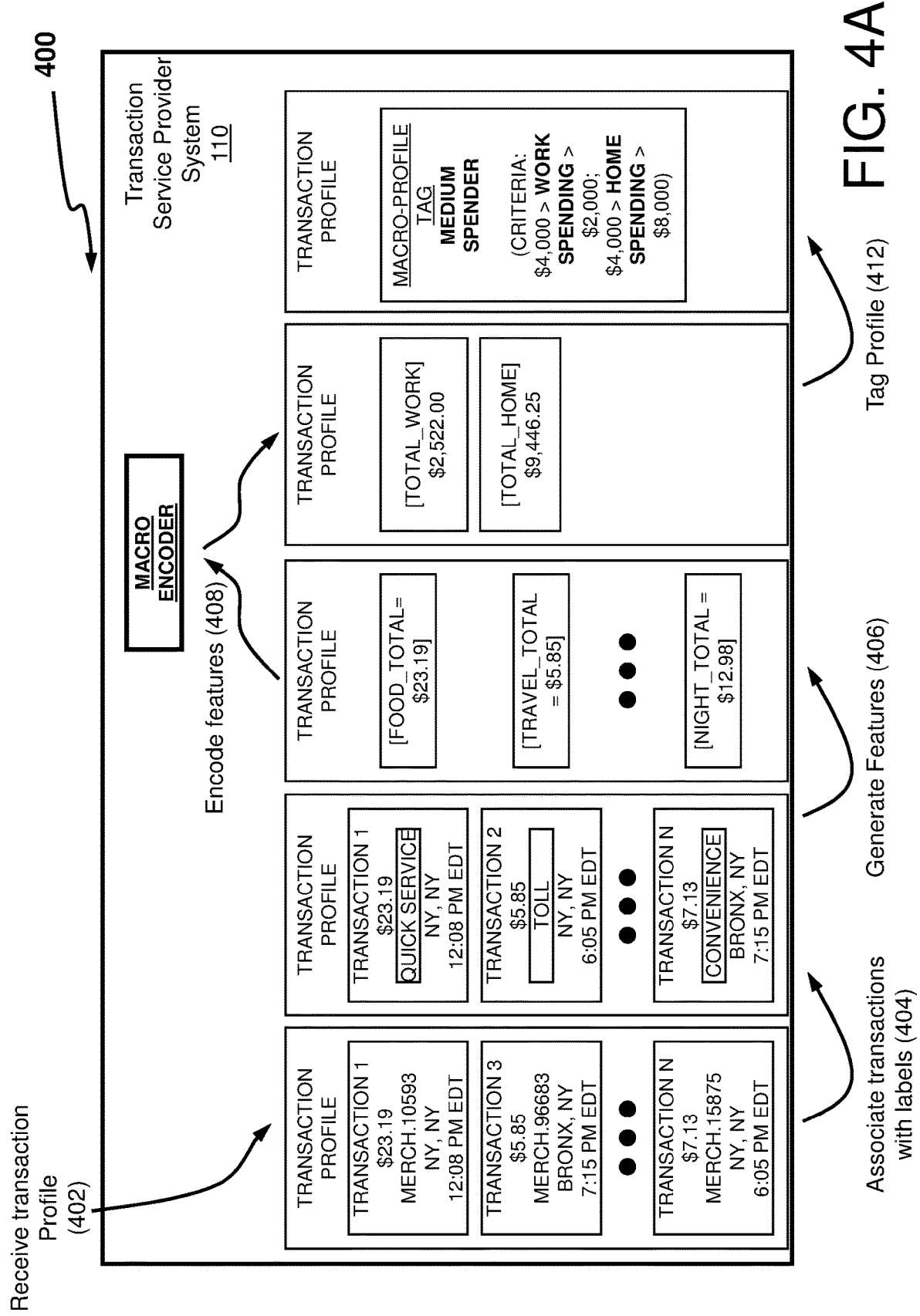
FIGS. 4A and 4B are diagrams of an implementation of a non-limiting embodiment of a process for generating profile tags.
Figure 4B:
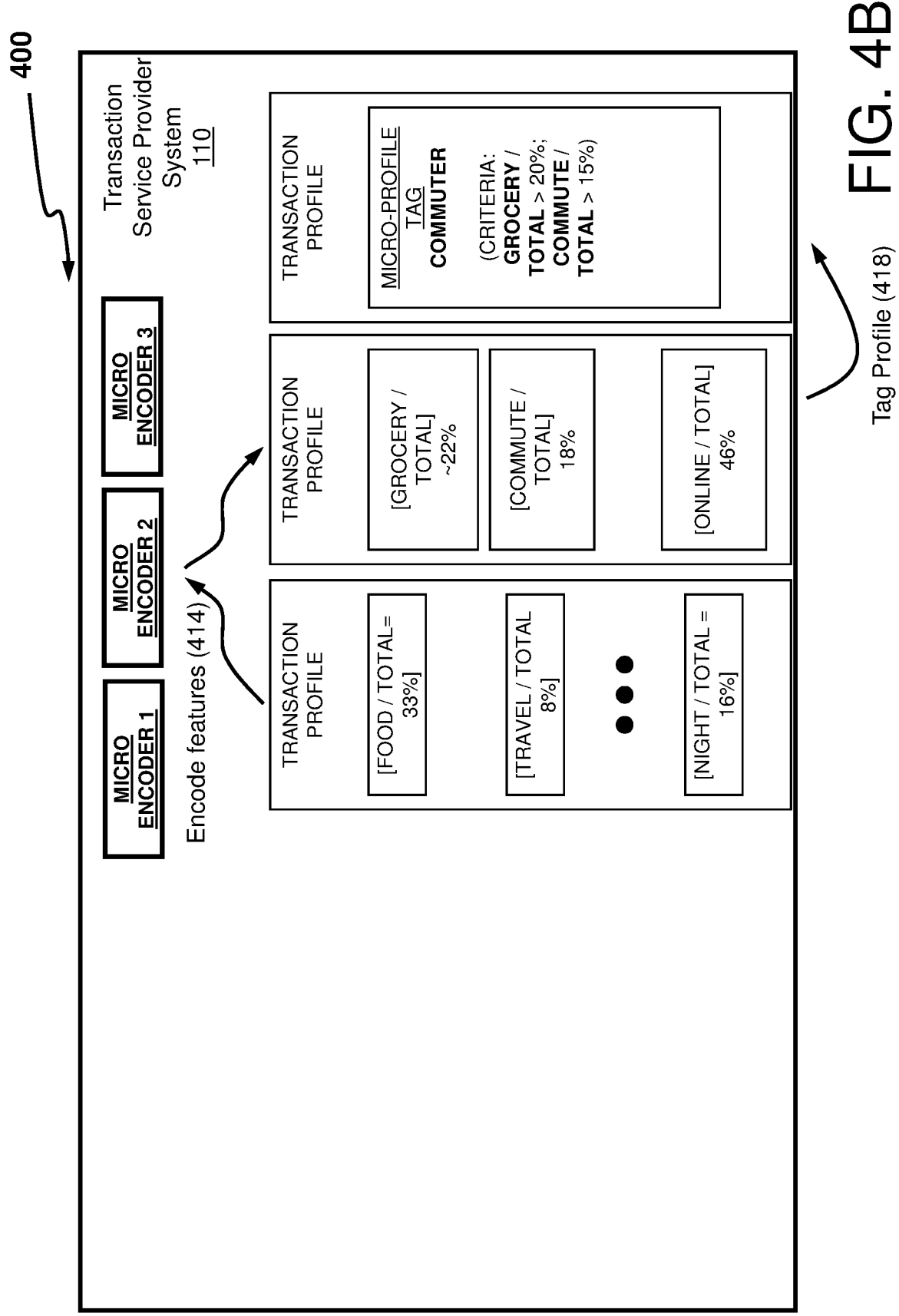

Referring now to FIGS. 4A and 4B, FIGS. 4A and 4B are an implementation 400 of a process of generating profile tags based on profile transaction history such as, for example, historical purchase data as illustrated. Initially, a computing device such as transaction service provider system 110 of FIG. 1 receives a transaction profile (402). The transaction profile includes a plurality of recorded transactions such as, for example, "TRANSACTION 1", "TRANSACTION 2", to "TRANSACTION N". Each transaction is then associated with a label, here, "QUICK SERVICE," "TOLL," and "CONVENIENCE," respectively (404). For example, TRANSACTION 2 is associated with a "TOLL" label, and such association may be made by comparing the merchant identification number (96683) with a list of merchants associated with the "TOLL" label. Once labels are associated with each of the transactions, a set of profile features are generated corresponding to each of the transactions (406). Feature generation may include processing portions of data associated with each transaction (e.g., converting the values such as the transaction value, address, etc., with a standardized value, address, etc.) to generate standardized representations of each transaction (e.g., a transaction type, transaction values associated with the transaction type, etc.). Where multiple transactions correspond to a particular feature, they may be added or otherwise aggregated (e.g., if multiple transactions are labeled as "TOLL" and a feature relating to the sum of all money spent crossing tolls was previously generated, the value of each toll transaction may be added and set as the value for the corresponding feature). As will be discussed later, the data associated with the set of profile features is processed independently, first by a macro-encoder to derive a macro-profile tag based on the transaction data, and second with a micro-encoder to derive a micro-profile tag based on the transaction data.

First, the features values associated with corresponding generated features are encoded with a macro-encoder to generate a set of first-reduced feature values that correspond to a first-reduced set of features (408). The set of first-reduced feature values may then be clustered. Once clustered, the cluster associated with the most features is selected and a macro-profile tag, associated with the selected cluster, is associated (e.g., tagged) with the transaction profile (412). As shown in FIG. 4A, the macro-profile tag is associated with criteria. The criteria associated with the macro-profile tag may be determined based on associated features resulting from clustering of transaction profiles while training the macro-encoder and/or micro-encoders.

Illustrated in FIG. 4B, based on the macro-profile tag associated with the transaction profile, the earlier-generated features (see 406) are then processed with a micro-encoder associated with the macro-profile tag (414). The second-reduced set of profile features are then clustered into subsets, as illustrated by categories associated with the corresponding transaction for each feature. Based on the clustering of the second-reduced set of features, the second-reduced features are compared to predetermined profiles having predetermined profile criteria and, based on the comparison, a micro-encoder tag is selected. For example, as shown in FIG. 4B, the micro-profile tag ("COMMUTER") is associated with transaction profiles where the ratio of the value of grocery transactions relative to the value of all transactions of the transaction profile is greater than 20%, and the value of commuting transactions relative to the value of all transactions of the transaction profile is greater than 15%. The micro-encoder tag is then associated with (e.g., tagged with) the transaction profile (418). As shown in FIG. 4B, the transaction profile is then tagged with the "COMMUTER" micro-encoder tag.

Although non-limiting embodiments have been described in detail for the purpose of illustration based on what are currently considered to be the most practical and preferred embodiments, it is to be understood that such detail is provided solely for that purpose and that the present disclosure should not be limited to the disclosed embodiments. On the contrary, the present disclosure is intended to cover modifications and equivalent arrangements that are within the spirit and scope of the appended claims. For example, it is to be understood that the present disclosure contemplates that, to the extent possible, one or more features of any embodiments can be combined with one or more features of any other embodiment.

What is claimed is:

1. A method, comprising:
    associating, with at least one processor, at least one transaction label from among a plurality of transaction labels with each of a plurality of recorded transactions, each transaction label associated with a transaction type;
    generating, with at least one processor, a set of pre-processed feature values corresponding to a set of profile features based on the plurality of recorded transactions from a transaction profile and the transaction labels corresponding to each of the plurality of recorded transactions, the set of profile features having a first dimension;
    processing, with at least one processor, the set of pre-processed feature values with a macro-encoder to generate a first-reduced set of pre-processed feature values corresponding to a first-reduced set of profile features having a second dimension less than the first dimension;
    clustering, with at least one processor, the first-reduced set of pre-processed feature values into at least two subsets of first-reduced feature values, a first subset of first-reduced feature values associated with a first macro-profile tag and a second subset of first-reduced feature values associated with a second macro-profile tag; and
    tagging, with at least one processor, the transaction profile with either the first macro-profile tag or the second macro-profile tag based on the clustering of the first-reduced set of feature values,
    wherein the first macro-profile tag is associated with transaction profiles having features corresponding to low-threshold purchases, and the second macro-profile tag is associated with transaction profiles having features corresponding to high-threshold purchases.

2. The method of claim 1, further comprising:
    determining, with at least one processor, an ordering of at least two subsets of first-reduced feature values.

3. The method of claim 1, further comprising:
    processing the set of pre-processed feature values with a micro-encoder to generate a second-reduced set of pre-processed feature values; and
    clustering the second-reduced set of feature values into a plurality of subsets of second-reduced feature values, wherein each subset of the second-reduced feature values is associated with a micro-profile tag corresponding to a unique account profile type.

4. The method of claim 3, further comprising:
determining, with at least one processor, an ordering of the plurality of subsets of second-reduced feature values.

5. The method according to claim 1, wherein each account profile type from among a plurality of account profile types is associated with features corresponding to a partially-unique set of behavior characteristics.

6. The method according to claim 5, further comprising:
receiving, with at least one processor, an instant transaction;
generating, with at least one processor, at least one feature value for the instant transaction;
determining, with at least one processor, that the at least one feature value does not correspond to a feature associated with the account profile type; and
determining, with at least one processor, that the instant transaction is a suspect transaction based on the determination that the at least one feature value does not correspond to a feature associated with the account profile type.

7. The method according to claim 5, further comprising:
receiving, with at least one processor, an instant transaction;
generating, with at least one processor, at least one feature value for the instant transaction;
determining, with at least one processor, that the at least one feature value corresponds to a feature associated with the account profile type; and
determining, with at least one processor, that the instant transaction is a non-suspect transaction based on the determination that the at least one feature value corresponds to a feature associated with the account profile type.

8. A system, comprising:
at least one processor programmed or configured to:
associate at least one transaction label from among a plurality of transaction labels with each of a plurality of recorded transactions, each transaction label associated with a transaction type;
generate a set of pre-processed feature values corresponding to a set of profile features based on the plurality of recorded transactions from a transaction profile and the transaction labels corresponding to each of the plurality of recorded transactions, the set of profile features having a first dimension;
process the set of pre-processed feature values with a macro-encoder to generate a first-reduced set of pre-processed feature values corresponding to a first-reduced set of profile features having a second dimension less than the first dimension;
cluster the first-reduced set of pre-processed feature values into at least two subsets of first-reduced feature values, a first subset of first-reduced feature values associated with a first macro-profile tag and a second subset of first-reduced feature values associated with a second macro-profile tag; and
tag the transaction profile with either the first macro-profile tag or the second macro-profile tag based on the clustering of the first-reduced set of feature values,
wherein the first macro-profile tag is associated with transaction profiles having features corresponding to low-threshold purchases, and the second macro-profile tag is associated with transaction profiles having features corresponding to high-threshold purchases.

9. The system according to claim 8, wherein the at least one processor is further programmed or configured to:
determine an ordering of at least two subsets of first-reduced feature values.

10. The system according to claim 8, wherein the at least one processor is further programmed or configured to:
process the set of pre-processed feature values with a micro-encoder to generate a second-reduced set of pre-processed feature values; and
cluster the second-reduced set of feature values into a plurality of subsets of second-reduced feature values, each subset of the second-reduced feature values associated with a micro-profile tag corresponding to a unique account profile type.

11. The system according to claim 9, wherein the at least one processor is further programmed or configured to:
determine an ordering of the plurality of subsets of second-reduced feature values.

12. The system according to claim 8, wherein each account profile type from among a plurality of account profile types is associated with features corresponding to a partially-unique set of behavior characteristics.

13. The system according to claim 12, wherein the at least one processor is further programmed or configured to:
receive an instant transaction;
generate at least one feature value for the instant transaction;
determine that the at least one feature value does not correspond to a feature associated with the account profile type; and
determine that the instant transaction is a suspect transaction based on the determination that the at least one feature value does not correspond to a feature associated with the account profile type.

14. The system according to claim 12, wherein the at least one processor is further programmed or configured to:
receive an instant transaction;
generate at least one feature value for the instant transaction;
determine that the at least one feature value corresponds to a feature associated with the account profile type; and
determine that the instant transaction is a non-suspect transaction based on the determination that the at least one feature value corresponds to a feature associated with the account profile type.

15. A computer program product, comprising at least one non-transitory computer-readable medium including program instructions that, when executed by at least one processor, cause the at least one processor to:
associate at least one transaction label from among a plurality of transaction labels with each of a plurality of recorded transactions, each transaction label associated with a transaction type;
generate a set of pre-processed feature values corresponding to a set of profile features based on the plurality of recorded transactions from a transaction profile and the transaction labels corresponding to each of the plurality of recorded transactions, the set of profile features having a first dimension;
process the set of pre-processed feature values with a macro-encoder to generate a first-reduced set of pre-processed feature values corresponding to a first-reduced set of profile features having a second dimension less than the first dimension;

cluster the first-reduced set of pre-processed feature values into at least two subsets of first-reduced feature values, a first subset of first-reduced feature values associated with a first macro-profile tag and a second subset of first-reduced feature values associated with a second macro-profile tag; and tag the transaction profile with either the first macro-profile tag or the second macro-profile tag based on the clustering of the first-reduced set of feature values, wherein the first macro-profile tag is associated with transaction profiles having features corresponding to low-threshold purchases, and the second macro-profile tag is associated with transaction profiles having features corresponding to high-threshold purchases.

16. The computer program product according to claim 15, wherein the program instructions, when executed by the at least one processor, further cause the at least one processor to:

determine, with at least one processor, an ordering of at least two subsets of first-reduced feature values.

17. The computer program product according to claim 15, wherein the program instructions, when executed by the at least one processor, further cause the at least one processor to:

process the set of pre-processed feature values with a micro-encoder to generate a second-reduced set of pre-processed feature values; and cluster the second-reduced set of feature values into a plurality of subsets of second-reduced feature values, each subset of the second-reduced feature values associated with a micro-profile tag corresponding to a unique account profile type.

18. The computer program product according to claim 16, wherein the program instructions, when executed by the at least one processor, further cause the at least one processor to:

determine an ordering of the plurality of subsets of second-reduced feature values.

19. The computer program product according to claim 15, wherein each account profile type from among a plurality of account profile types is associated with features corresponding to a partially-unique set of behavior characteristics.

20. The computer program product according to claim 19, wherein the program instructions, when executed by the at least one processor, further cause the at least one processor to:

receive an instant transaction;

generate at least one feature value for the instant transaction;

determine that the at least one feature value does not correspond to a feature associated with the account profile type; and determine that the instant transaction is a suspect transaction based on the determination that the at least one feature value does not correspond to a feature associated with the account profile type.

* * * * *